April 19, 1932. O. A. LAYNE 1,854,517

WELL SCREEN

Filed July 11, 1928

Inventor.
Ollyn A. Layne.
Attorney.

Patented Apr. 19, 1932

1,854,517

UNITED STATES PATENT OFFICE

OLLYN A. LAYNE, OF LOS ANGELES, CALIFORNIA

WELL SCREEN

Application filed July 11, 1928. Serial No. 291,856.

This invention has to do with well screens—straining devices which are used largely in oil wells for purposes of straining the sand and other solid matter from the fluid which enters the well pipe; and it may be said that it is an object of the invention to provide a simple and easily manufactured form of well screen which provides a very large total screening area per lineal foot of pipe, and at the same time provides great strength. I may say at the outset that my screen provides screening area many times as large as the perforated pipe now in use, and whereas the perforated pipe either decreases the strength of the well pipe, or at least does not increase it, my construction provides a well pipe screen which increases the strength of the pipe, both as to longitudinal and transverse forces, by as much as twenty-five percent. The foregoing, however, expresses only the general objects and accomplishments of my invention; there are further objects and correspondingly further accomplishments which will be understood from the following description.

Typically the invention is embodied in a double-walled screen pipe, the two walls being spaced apart but being so assembled and physically integrated with each other as to utilize both their strengths. The outer wall, which is typically, although not necessarily, composed of thinner metal than the inner wall, is provided with a plurality of elongated and relatively narrow straining slots which extend horizontally or circumferentially around the pipe. For maintaining the proper spacing between the two walls I provide a suitable series of spacers, preferably and typically in the form of ribs. These ribs are also preferably made, in effect, integral with one or the other of the walls so that their strengths are added to the strengths of the pipe walls. In the specific and illustrative embodiment of the invention hereinafter described in detail, these spacing ribs are integrated with the inner wall.

The spaces between the two walls and between adjacent ribs form flow chambers or channels; and the arrangement is such that the screening slots in the outer wall all register completely with one or another of said flow channels. The relative arrangement is such that no spacing rib closes any straining slot, thus maintaining all of the straining slots at their highest possible capacity. In the preferred and specific embodiment the straining slots are arranged in vertical rows; and the spacing ribs extend vertically and are placed between rows of straining slots; so that each row of straining slots communicates directly and uninterruptedly with the flow channel between two adjacent spacing ribs. The screened fluid which flows into such a flow channel then finds its way inside the pipe through openings in the inner wall. These inner wall openings may or may not register directly with the straining slots in the outer wall; their only function being to carry inwardly the fluid which is fed into the flow channels, and to be of such aggregate capacity as not to impede the flow through the straining slots.

In addition to the simplicity and great strength of my pipe screen, I may here call attention to another characteristic feature of great practical importance. The aggregate screening capacity is so large that the flow through the several screening slots is comparatively slow. In the average perforated pipe the aggregate screen area per foot of pipe is comparatively small; the fluid velocity through the screening openings is very high; and the fluid, particularly when accompanied by sand and silt, wears the screen openings very quickly, with the result that the screening elements soon become useless and should be frequently replaced. But replacement is often impossible. It is therefore of great practical importance that a screen, when inserted in a well, should have long life; and this I provide, not only by the material of which my screen is made, but primarily by the provision of a relatively very large aggregate screening area. And this large screening area, besides minimizing wear, also effectively increases the screening efficiency of each slot, the fluid passing through each slot comparatively slowly and therefore carrying comparatively little solid matter with it through the slot.

With these preliminary observations in mind I now proceed to a detailed description of a specific and illustrative embodiment of my invention, reference for this purpose being had to the accompanying drawings, in which.

Figure 1:
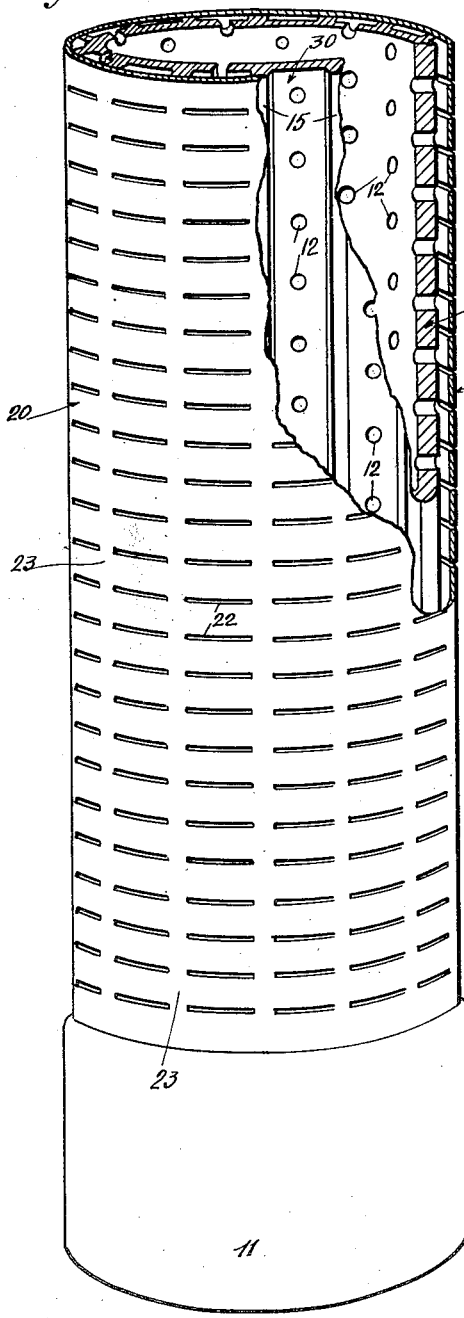
Fig. 1 is a broken perspective illustrating an embodiment of the invention.
Figure 2:
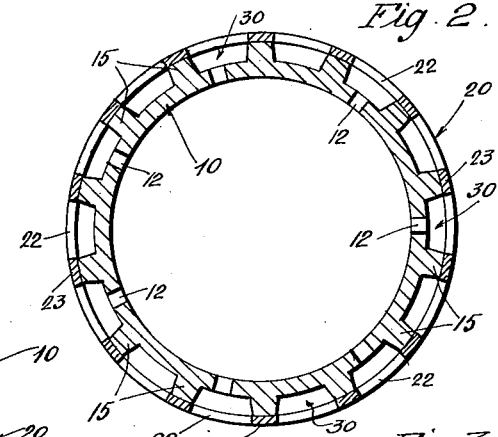
Fig. 2 is a cross section of the screen pipe.

In the accompanying drawings the inner wall 10 of my strainer is illustrated as made of ordinary well pipe; and it may be composed of well pipe of any suitable thickness and selected size. This well pipe is used in standard lengths, the lengths being joined together by the usual screw-threaded collars 11, one at the end of each length. To form my screen, a length of well pipe is provided with openings 12 which may be formed in any suitable manner, as by punching or drilling or slotting; but they are here shown preferably as round holes such as may be easily punched or drilled. To suit the specific form of my invention wherein longitudinal spacing ribs are used, these holes are preferably arranged in longitudinal rows, as illustrated in the drawings; but the holes in adjacent rows may be arranged in staggered relation, as is also clearly illustrated. In forming these holes 12 there are only two controlling factors to be kept in mind. First the aggregate area of the holes is sufficient to pass the total fluid flow at comparatively low velocity and without forming any appreciable obstruction to the fluid flow; and second the holes are so formed as a weaken the pipe as little as possible. Round holes suit these requirements well; in proportion to their total area they weaken the pipe to a minimum degree, both as regards longitudinal tensile strength and lateral crushing, bending or shearing strength. Placing the holes in staggered relation also materially decreases the amount of weakening.

Around the outside of inner wall 10 are placed, in spaced relation, the longitudinal spacing ribs 15. The number of these ribs need not necessarily be equal to the number of rows of holes 12; but in the specific illustration I show such relation. Ribs 15 may be formed of any suitable metal, such as iron or steel. For instance they may be formed of substantially the same steel as that of the pipe. They are welded to the inner wall 10, either continuously along their lengths, or at least at intervals along their lengths; so that, for all tensile strength purposes, they become integral parts of the inner wall, and are so illustrated in the drawings.

Figure 3:
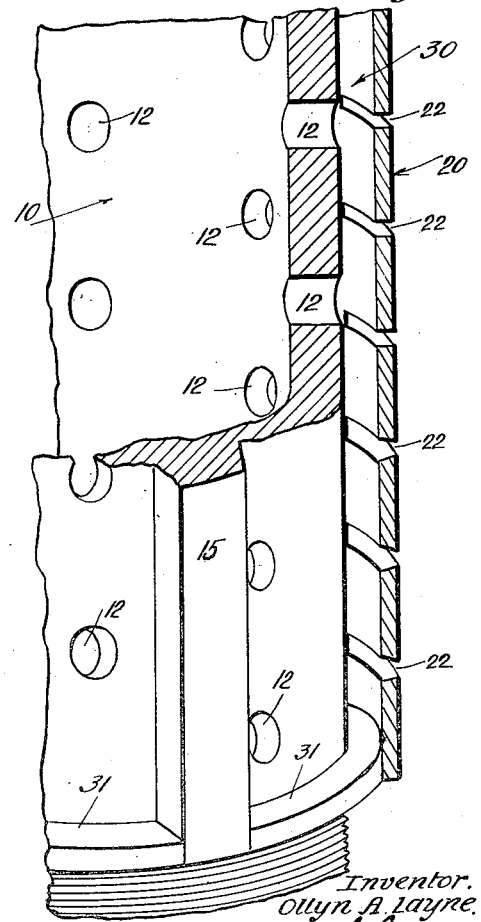
Fig. 3 is an enlarged fragmentary view, partly in section and partly in elevation.

These ribs 15 are of uniform thickness so that the outer strainer walls 20 may be placed about these ribs and contact with all of them throughout their lengths. The relative sizes of inner wall, ribs and outer wall are preferably such that the outer wall may be heat-shrunk upon the ribs to surround the ribs snugly and tightly; but at the same time the shrink is not forcible enough to draw the outer wall out of its true circular shape. The structure thus assembled becomes, for all physical purposes, a single integral structure, especially so far as tensile strength and lateral strength are concerned. The shrunk grip of the outer wall upon the ribs is sufficient to keep the outer wall from sliding longitudinally under any forces imposed upon the strainer pipe; but, in practical manufacture of the screen I weld the outer wall to one of the ribs. This may be done by closing the seam weld of the outer wall directly over a rib, thus joining the outer wall to a rib and thus to the inner wall. And I also preferably close and weld the ends of the outer wall to the inner wall all round, as indicated at 31 in Fig. 3.

The outer wall 20 is preferably provided with a series of rows of straining slots 22 which have their lengths arranged horizontally or circumferentially of the pipe. These slots are of limited individual lengths, being only as long as the clear distance between adjacent ribs 15. The assembly is made so that a row of slots 22 will register directly with the space between adjacent ribs, and the webs 23, between adjacent rows of slots 22, will register with and rest upon the ribs 15. The longitudinally extending webs 23 of the outer wall, and the longitudinal ribs 15, together add more tensile strength to the pipe structure than has been taken away from pipe 10 by the perforations 12. In fact, in a typical practical design, the tensile strength of the complete structure is about 25 per cent greater than the tensile strength of the unperforated pipe 10. And this is true in spite of the fact that horizontal slots 22 are used. And the outer wall 20 also adds materially to the lateral strength of the pipe as regards crushing, bending or shearing forces. In a typical average design the lateral strength of the complete assembly is about 25 per cent greater than the lateral strength of the corresponding unperforated pipe 10. This additive lateral strength is due primarily to the lateral strength of the outer wall 20 and to the fact that the outer wall fits closely and tightly around the spacers or ribs, but is at all times maintained in perfect circular formation. The shrunk fit of the outer wall upon the ribs is tight enough to accomplish the purposes described; but the shrink is never made enough to draw the portions of wall 20 between ribs 15 materially out of true circular formation. The result is that the outer wall maintains substantially its full lateral strength, the narrow slots 22 reducing that lateral strength but by a small amount.

The size and number of slots 22 may be made as desired. I prefer to make the slots not too long so that the webs 23 of the outer wall are not separated too far. In a typical instance slots 22 may be about one-eighth of an inch wide and about one inch to one inch and a quarter long; and their typical vertical spacing may be about an inch. And the webs 23 may be about three-eighths of an inch wide. Using such slots at such spacings, and such reinforced construction, I give to a length of pipe about ten times the total screening area that can be obtained by slotting openings in the pipe itself, and I still retain all of the original strength of the well casing, in fact increase its strength as much as 25%.

The perforations 12 may be individually of any suitable size, but the aggregate area of these perforations is preferably about the same as the aggregate area of slots 22. The aggregate area of perforations 12 is preferably not materially less than that of slots 22, so that, the fluid having once passed the straining slots, its passage will not be materially obstructed by perforations 12. But each individual opening 12 is preferably of much larger dimension than the width of a slot 22 so as to readily pass anything which a slot 22 may pass. Slots 22 may be made of any desired form, for instance they may be of constant width throughout the thickness of wall 20, or they may be wider at the inner face of the wall than at the outer face.

Due to the comparatively large screening area in my assembly, the fluid passes comparatively slowly and quietly through the straining slots and thence into the passage spaces 30 between the two walls and between adjacent ribs 15. Here the velocity of flow is further reduced, due to the fact that the space through passage 30 is much larger than slots 22. Then the fluid flows indiscriminately through any and all of the perforations 12 which communicate with the several passages 30. The flow through the straining slots is so slow that the coarse material is left behind as the fluid passes the slots. The straining functions of the slots are not due primarily, or at least not exclusively, to the fact that the solid material may be of such size that it cannot pass through the slots 22. The slots are placed horizontally so that the coarse solid material will pile up at the lower edge of the slot rather than pass through. For instance the vertical width of a slot 22 may be, in a typical instance, not more than the thickness of the outer wall 20; so as to form a shelf on which the coarser of suspended solid material will pile up. The very fine material of course passes on through slots 22 and openings 12, to be removed from the well along with the fluid. But the coarser material, although it may be small enough to pass through slots 22, is dropped at those slots on their shelving bottoms, due to the extremely low velocity through the slots, and remains there. This action, it will now be seen, is due to the large number of large horizontal slots that cause separation, not by straining through small and easily clogged openings, but by reduction of velocity.

I claim:

A double tube well screen having annularly spaced inner and outer tubes, circumferentially spaced ribs attached rigidly to the outer surface of the inner tube and extending longitudinally substantially the entire length of the inner tube, the inner tube having vertically spaced perforations registering with the spaces between ribs, the outer tube fitting tightly and directly about the ribs and having circumferentially spaced longitudinal rows of longitudinally spaced narrow circumferential slots, the rows of slots registering with the vertically extending spaces between ribs and the intervening unslotted portions of the outer tube resting directly on the ribs.

In witness that I claim the foregoing I have hereunto subscribed my name this 12th day of June, 1928.

OLLYN A. LAYNE.